United States Patent Office 3,003,052
Patented Oct. 3, 1961

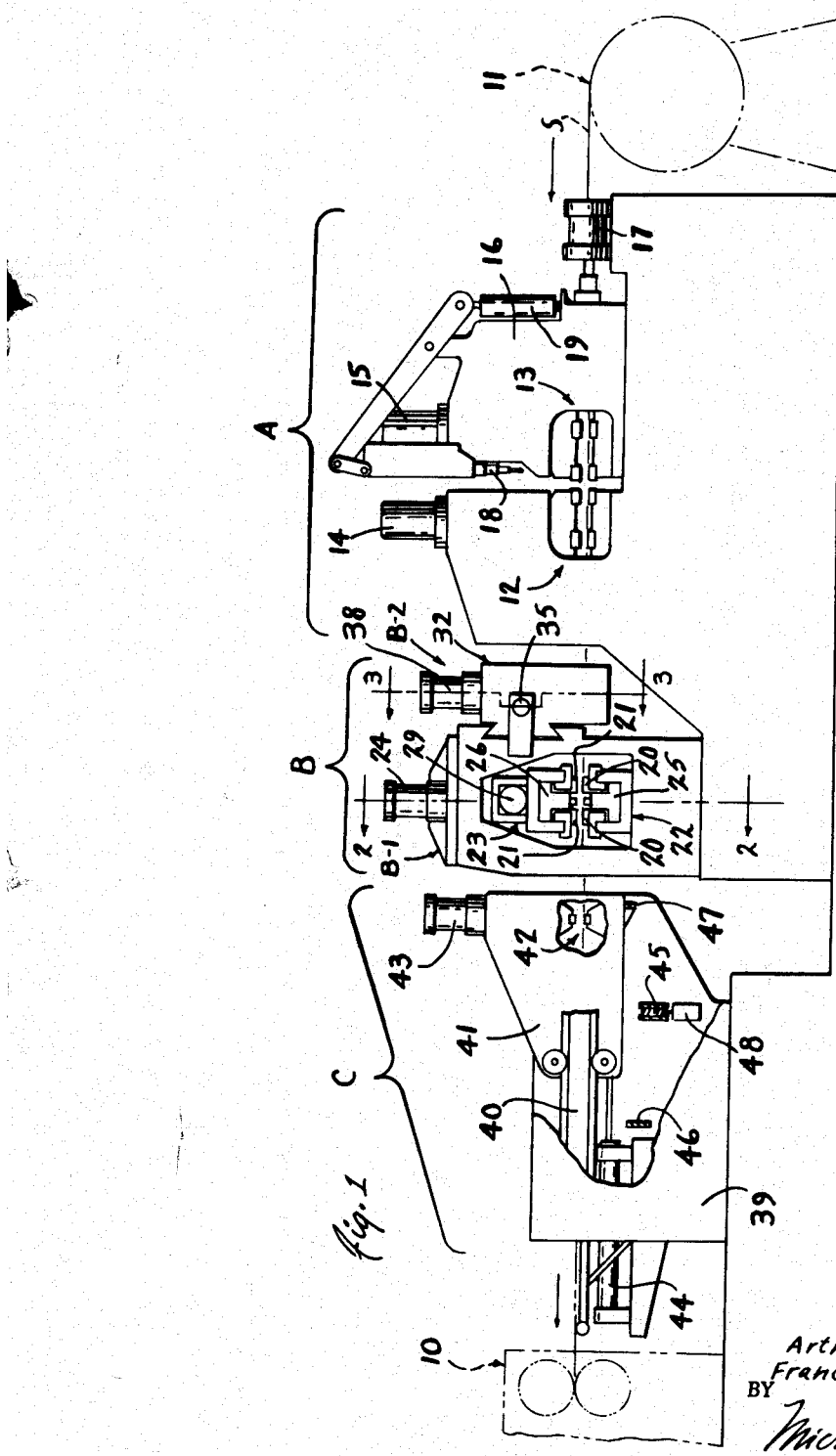

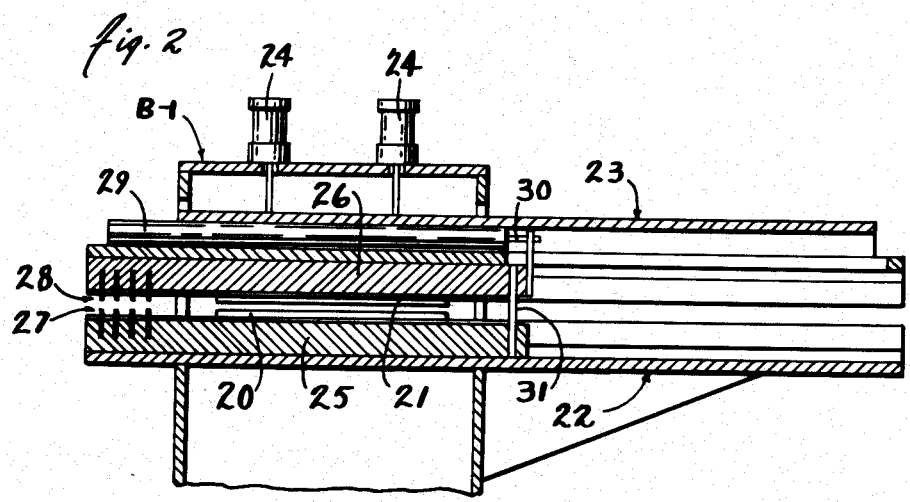
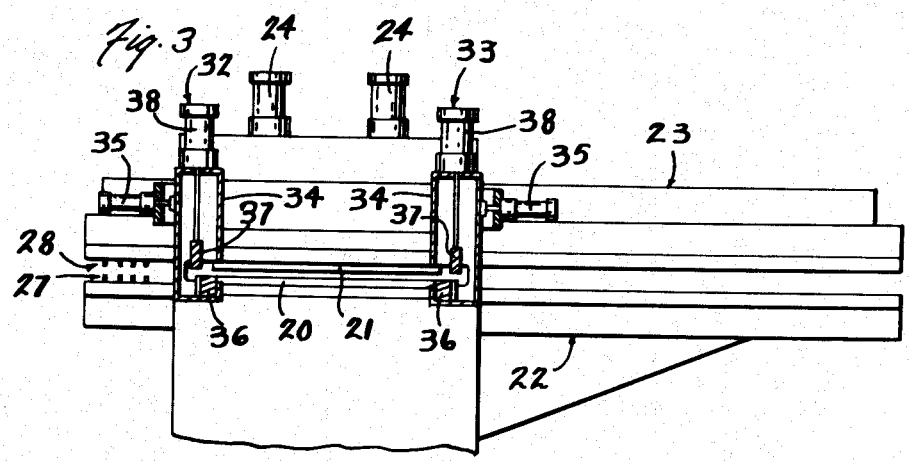

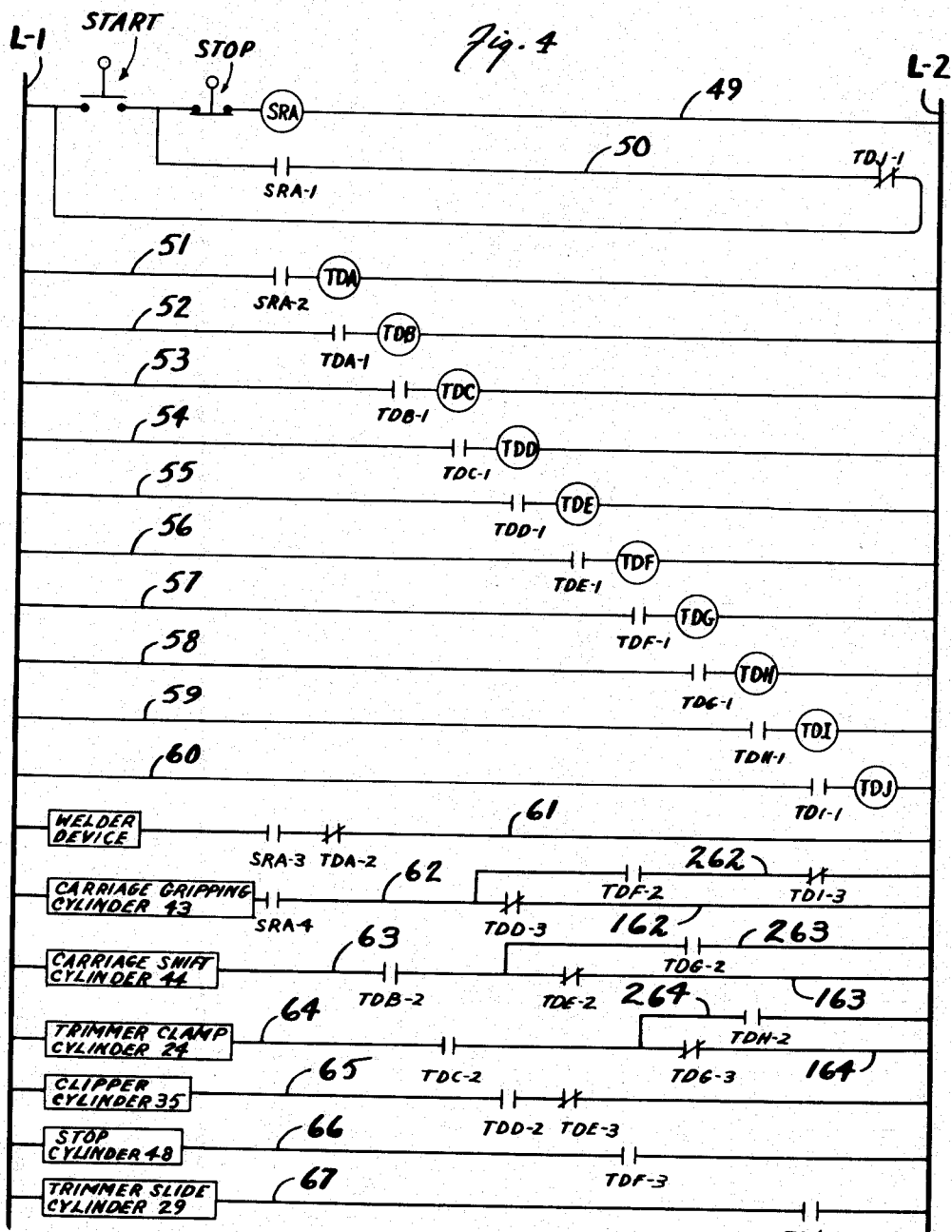

3,003,052
STRIP JOINING APPARATUS
Arthur L. Williams and Francis A. Bodenheim, Warren, Ohio, assignors, by mesne assignments, to The McKay Machine Company, Youngstown, Ohio, a corporation of Ohio
Filed Sept. 21, 1959, Ser. No. 841,206
7 Claims. (Cl. 219—101)

The present invention relates to apparatus for joining strip material in end-to-end relation, more particularly to apparatus for welding the trailing end of one metal strip to the leading end of another metal strip and for treating the welded joint thus formed between the two strip ends to eliminate transverse protrusions, and the principal object of the invention is to provide new and improved apparatus of the character described.

In many strip processing operations, it is impractical to run a length of strip completely through a strip consuming line and to then thread the leading end of another length of strip into the line. The resulting shutdown time, while the strip is being threaded, would seriously curtail production. Moreover, certain processes require that the strip pass through the line at a given speed; accordingly, in some instances, the strip portion which is slowly threaded into the line will be improperly processed and must be discarded. While the above difficulties can be alleviated by feeding long lengths of strip to the line, there are, of course, practical limitations to the length of strip which can be produced, transported and handled.

It has heretofore been proposed to solve the problem aforesaid by securing the trailing end of one strip passing through the line to the leading end of another strip to thus, in effect, provide a strip of infinite length. This solution, while salutary, presents certain difficulties. Practically any method of securing the strip ends together causes a thickened joint of reduced flexibility which, in many applications, interferes with proper line operation since the latter is dependent upon constant strip homogeneity. To minimize the aforesaid undersirable features of the joint, the strip ends have been secured together by butt-welding rather than by lap-welding or the like. Unfortunately, though, even the butt-welding of strip ends together results in a somewhat thickened joint.

Where requirements of the strip consuming line are such that even a relatively slight thickening of the joint is objectionable, means have been included to trim the welded point to remove any transverse protuberances. Heretofore, such trimming means required the presence of an operator who aligned the trimming means with the welded joint. While this arrangement, at times, functioned satisfactorily, its reliance on operator skill too often resulted in inefficiency.

The present invention provides completely automatic strip joining apparatus which consistently produces a welded joint suitable for passage through the most critical strip-consuming line. These and other advantages will readily become apparent from a study of the following description and from the drawings appended hereto.

In the drawings accompanying this specification there is shown, for purpose of illustration, an embodiment which the invention may assume, and in these drawings:

FIGURE 1 is a side elevational view of strip joining apparatus embodying the present invention, FIGURE 2 is a sectional view generally corresponding to the line 2—2 of FIGURE 1, FIGURE 3 is a sectional view generally corresponding to the line 3—3 of FIGURE 1, and FIGURE 4 is a schematic diagram of a control circuit for effecting the desired operation of the apparatus seen in FIGURES 1, 2 and 3.

With reference to FIGURE 1, the strip joining apparatus illustrated is adapted to be interposed between the leading end of a strip-consuming line 10 and a strip-dispensing device such as a pay-off reel 11. In brief, strip S normally passes in the direction of the arrow from the pay-off S normally passes in the direction of the arrow from the pay-off reel 11 to the line 10 through the strip joining apparatus without hinderance from the latter since it is normally inoperative. When, however, the coil on the pay-off reel is consumed by the line and its trailing end passes into the strip joiner, the latter will be activated to grip such trailing end in proper position between the jaws of a welder, the leading end of another coil of strip will be properly gripped between other welder jaws (such other coil being rotatably supported on the pay-off reel 11 or upon another, adjoining pay-off reel), and the welder then triggered to join the strip ends together. After welding, the strip joiner will automatically trim the weld joint to remove any transverse protuberances and will then release the strip so that it may once again pass freely through the strip joiner into the line until this coil is also consumed whereupon the strip joiner will once again be activated to join the leading end of still another coil of strip to the trailing end of the strip therewithin.

As presently constituted, the strip joining apparatus herein illustrated may, for convenience of description, be divided into a welding section A, a joint trimming section B, and a strip moving section C. Considering first the welding section A, this portion of the apparatus comprises respective pairs of strip clamping jaws 12 and 13 which preferably extend transversely of the strip from edge to edge thereof.

Each jaw pair comprises relatively movable upper and lower jaws and in the present embodiment, the upper jaw of pair 12 is moved toward and away from its lower jaw for clamping the strip therebetween by means of a fluid cylinder 14 while the upper jaw of pair 13 is moved toward and away from its lower jaw by means of a fluid cylinder 15. While not shown, the upper jaws of each jaw pair will, of course, be suitably supported for the necessary movement aforesaid. In addition to the movement of the upper jaws of the jaw pairs 12 and 13 toward and away from respective lower jaws, jaw pair 13 is movable longitudinally of the strip, toward and away from jaw pair 12, by effecting movement of a carriage 16 on which such jaw pair is mounted. Such movement of carriage 16 may conveniently by effected by means of a fluid cylinder 17. Normally, the respective jaws of jaw pairs 12 and 13 are spaced-apart to permit the strip consuming line 10 to freely pull the strip through the welder. Additionally carriage 16 is normally positioned as seen in FIGURE 1 wherein the jaw pair 13 is spaced from the jaw pair 12.

Shiftably supported by carriage 16 is an elongated guage bar 18 which extends substantially from edge to edge of the strip. For a purpose to appear, this bar may be shifted by means of a fluid cylinder 19 from the position seen in FIGURE 1 to a position wherein it is disposed intermediate the jaw pairs 12 and 13. Also for a purpose to appear, bar 18 is stepped to provide portions of various widths. Although not shown, welding section A will comprise suitable electrical components to provide for passing welding current between the jaw pairs 12 and 13 and thus between the respective strip ends gripped by the jaw pairs.

Turning next to the joint trimming section B, this section is spaced from the welding section A longitudinally of the strip and in the direction of normal strip movement and at the present time comprises a portion B–1 for trimming welded joint protuberances projecting flatwise of the strip and a portion B–2 for trimming welded joint protuberances projecting edgewise of the strip. As herein illustrated, portion B–2 is disposed intermediate the welding section A and portion B–1; however, it is to be understood that portions B–1, B–2 could be reversed, if desired, or one or the other could be omitted, where its use is deemed unnecessary.

Portion B–1 of joint trimming section B is presently shown to comprise relatively movable, strip clamping jaws 20 and 21. Each jaw preferably comprises a pair of elongated jaw members extending transversely of the strip substantially from edge to edge thereof, such jaw members being spaced longitudinally of the strip to straddle the welded strip joint which is adapted to be disposed therebetween. Lower jaws 20 are presently immovably carried by a fixed support 22 while upper jaws 21 are carried by a vertically shiftable slide 23 for movement toward jaws 20 to clamp the strip therebetween. Fluid cylinders 24 may be employed to effect the movement aforesaid of slide 23.

Also respectively carried by fixed support 22 and by slide 23 are lower and upper slides 25, 26 reciprocable horizontally in a direction edgewise of the strip. As best seen in FIGURE 2, slides 25, 26 carry respective sets of knives 27, 28 which engage the weld joint and trim it substantially flush with respective strip faces when such slides are drawn from left to right as viewed in FIGURE 2. Any suitable means may be employed to shift slides 25, 26 and as herein disclosed, a fluid cylinder 29 has its piston rod 30 connected with the slide 26. The latter may have a sliding pin connection 31 with the underlying slide 25 to provide for simultaneous horizontal shifting movement of slide 25, 26, upon movement of piston rod 28, without interfering with the vertical movement of slide 26.

With reference to FIGURES 1 and 3, portion B–2 of the joint trimming section B presently comprises a pair of clippers 32, 33 which are designed to notch respective strip edges at the weld joint. It is to be understood that such clippers are identical, with the exception that they are of opposite hand. Each clipper 32, 33 comprises a frame 34 which is mounted for sliding movement on the joint trimming section B–1 in a direction edgewise of the strip. Respective fluid cylinders 35 are herein shown employed to effect the sliding movement aforesaid of respective clippers. Fixedly mounted at the lower end of each clipper frame 34 is a stationary knife 36. A movable knife 37 is carried by the piston rods of respective fluid cylinders 38 for movement toward respective knives 36 to notch the strip edge positioned therebetween.

Normally, clippers 32, 33 are spaced from the edges of the strip so as not to interfere with free movement thereof from the pay-off reel to the strip consuming line. When, however, the strip is to be notched, both clippers will be moved toward the strip by the cylinders 35 until the clippers are properly positioned to notch the strip. When such position is reached, as sensed, perhaps, by limit switches which are actuated by engagement with the strip edges, the cylinders 38 will be operated to move the knives 37 to engagement with respective knives 36 to thus notch the strip edges positioned therebetween.

Strip moving section C (FIGURE 1) presently comprises a frame 39 providing spaced rails 40 extending longitudinally of the strip and disposed on respective sides thereof. Guided by and movable along the rails 40 is a carriage 41 which carries a pair of relatively movable strip clamping jaws 42 which preferably extend from edge to edge of the strip. A fluid cylinder 43 is carried by carriage 41 to effect movement of the clamping jaws 42 toward each other to clamp the strip therebetween. Means are provided for reciprocating carriage 41 and at the present time, a fluid cylinder 44 is carried by the frame and has its piston rod connected to the carriage.

Means are provided for interrupting movement of the carriage when it has traveled the required amount and as herein disclosed, such means comprises stops 45 and 46 which are carried by the frame 39 and which engage a bracket 47 on the carriage. For a purpose to appear, stop 45 is shiftable by means of a fluid cylinder 48 toward and away from the path of travel of the carriage.

In order to provide the desired operation of the apparatus hereinbefore described, certain control apparatus is required and is in part seen schematically in FIGURE 4. As illustrated, there is presently provided a solenoid relay SRA having normally open contacts SRA–1, SRA–2, SRA–3, and SRA–4; a time delay relay TDA having normally open contacts TDA–1 and normally closed contacts TDA–2; a time delay relay TDB having normally open contacts TDB–1 and TDB–2; a time delay relay TDC having normally open contacts TDC–1 and TDC–2; a time delay relay TDD having normally open contacts TDD–1 and TDD–2 and normally closed contacts TDD–3; a time delay relay TDE having normally open contacts TDE–1 and normally closed contacts TDE–2 and TDE–3; a time delay relay TDF having normally open contacts TDF–1, TDF–2 and TDF–3; a time delay relay TDG having normally open contacts TDG–1 and TDG–2 and normally closed contacts TDG–3; a time delay relay TDH having normally open contacts TDH–1 and TDH–2; a time delay relay TDI having normally open contacts TDI–1 and TDI–2 and normally closed contacts TDI–3; and a time delay relay TDJ having normally closed contacts TDJ–1.

Also illustrated in FIGURE 4 by appropriately labeled boxes are a plurality of electromagnetic valves or the like which control operation of the fluid cylinders hereinbefore disclosed. In the interest of simplifying the present disclosure, the valve or other device which controls operation of the cylinder 19 and of the welding apparatus A is labeled "Welder Device," the valve which controls cylinder 43 which in turn effects movement of the carriage jaws 42 is labeled "Carriage Gripping Cylinder 43," the valve which controls the cylinder 44 which in turn effects movement of carriage 41 is labeled "Carriage Shift Cylinder 44," etc. Also in the interest of simplicity, certain circuits which control well-known cycles of operation have been omitted.

Still referring to FIGURE 4, the solenoid coil of relay SRA is connected across power lines L–1, L–2 by means of a circuit 49. Interposed in series in such circuit are the normally open contacts of a "Start" button and the normally closed contacts of a "Stop" button. For a purpose to appear, a circuit 50 shunts around the contacts of the "Start" button. In a manner similar to relay SRA, the solenoid coils of the time delay relays TDA through TDJ are connected across the power lines L–1, L–2 by means of respective circuits 51 through 60. Moreover, the previously mentioned valves for the fluid cylinders 19, 43, 44, 24, 35, 48 and 29 are connected across the power lines by means of respective circuits 61 through 67. As illustrated, circuit 62 has parallel branches 162, 262, circuit 63 has parallel branches 163, 263, while circuit 64 has parallel branches 164, 264.

Turning now to the electrical contacts controlled by the relays hereinabove mentioned, contacts SRA–1, 2, 3 and 4 are interposed in respective circuits 50, 51, 61 and 62; contacts TDA–1 and 2 are interposed in respective circuits 52 and 61; contacts TDB–1 and 2 are interposed in respective circuits 53 and 63; contacts TDC–1 and 2 are interposed in respective circuits 54 and 64; contacts TDD–1, 2 and 3 are interposed in respective circuits 55, 65 and 162; contacts TDE–1, 2 and 3 are interposed in respective circuits 56, 163 and 65; contacts TDF–1, 2 and 3 are interposed in respective circuits 57, 262 and 66; contacts TDG–1, 2 and 3 are interposed in respective circuits 58, 263 and 164; contacts TDH–1 and 2 are interposed in respective circuits 59 and 264; contacts TDI–1, 2 and 3 are interposed in respective circuits 60, 67 and 262; and contacts TDJ-1 are interposed in circuit 50.

With the control circuit components positioned as seen in FIGURE 4, it will be noted that no current is flowing in any of the circuits. At this time, therefore the various parts of the strip joining apparatus are positioned as seen in FIGURE 1 wherein the strip may pass freely through the apparatus from the pay-off reel 11 to the strip consuming line 10. When the trailing end of the strip has been unwound from the pay-off reel 11 and has passed beyond the jaws of the welding section A, the operator will press the "Start" button. Such button could also, of course, be actuated automatically by the trailing end of the strip if desired. Upon pressing of the "Start" button, the coil of solenoid SRA in circuit 49 will be energized to instantaneously close the normally open contacts SRA-1, 2, 3 and 4. The closing of contacts SRA-1 will complete the holding circuit 50 to retain SRA energized even though the "Start" button is thereafter released. The closing of contacts SRA-2 in circuit 51 will energize the solenoid coil TDA which will start the running of a delay period, at the end of which contacts TDA-1 will close and contacts TDA-2 will open.

The closing of contacts SRA-3 in circuit 61 will initiate a welding cycle of the welding section A and will also have the following effect upon strip movement: Firstly, movement of the strip from right to left (in the position of parts shown) will be arrested. This will, perhaps, be accomplished by stopping the illustrated entry pinch rolls of the strip-consuming line. Thereafter, the guage bar 18 will be moved downwardly between the jaw pairs 12, 13 of the welder to position the desired step of the guage bar therebetween.

The trailing end of the strip will then be shifted, as by reverse rotation of the entry rolls aforesaid, to abut such end with the guage bar. Clamping jaws 12 of the welder will then move together to clamp the trailing strip end in position for welding. The leading end of another length of strip will then be introduced between the jaws 13 in abutment with the guage bar 18 and such jaws will then move together to clamp this strip end in position. Next, the guage bar 18 will be withdrawn from between the jaw pairs 12, 13 and the welder carriage 16 shifted to the left to abut the two strip ends. Welding current will then be momentarily passed between the jaw pairs 12, 13 through the strip to weld the abutted strip ends together. Since it forms no part of the present invention, the necessary controls for carrying out the aforesaid strip movement and the welding operation have not been shown. It is to be understood, however, that any conventional arrangement may be employed for this purpose. Finally, the closing of contacts SRA-4 will cause the jaws 42 of the carriage 41 to move together to tightly grip the strip therebetween.

As previously mentioned, the delay period initiated by energization of TDA will time out following the completion of the welding operation to open contacts TDA-2 in circuit 61 to thus return the various welder parts to the positions seen in FIGURE 4 wherein the strip will be unclamped thereby. Note, however, that clamping jaws 42 at this time are still holding the strip against movement. The closing of contacts TDA-1 in circuit 52 will energize solenoid coil TDB and initiate a time delay period at the termination of which contacts TDB-1 and 2 will close.

The closing of contacts TDB-2 in circuit 63 will cause the fluid cylinder 44 to shift carriage 41 to the left until the stop 46 arrests carriage movement (it being understood that stop 45 is retracted at this time so as not to interefere with such movement). The movement aforesaid of the carriage will shift the strip from right to left (in the position of parts viewed in FIGURE 1) so that the welded joint between the strip ends is precisely located in alignment with the clippers 32, 33 of the joint trimming section B. The closing of contacts TDB-1 in circuit 53 will energize solenoid coil TDC to initiate a time delay period at the termination of which contacts TDC-1 and 2 will close.

The closing of contacts TDC-2 in circuit 64 will cause current flow in this circuit and also in circuit 164 to effect operation of the fluid cylinders 24 to close the clamping jaws 21, 20 of the joint trimmer B-1 on the strip and to thus hold the latter immobilized. The closing of contacts TDC-1 in circuit 54 will energize solenoid coil TDD and initiate a time delay period at the termination of which contacts TDD-1 and 2 will close and contacts TDD-3 will open.

The closing of contacts TDD-2 in circuit 65 will cause the clipper cylinders 35 to shift respective clippers toward each other until such clippers are properly positioned with respect to respective strip edges. As previously mentioned, when such clippers are properly positioned, a suitable mechanism (not shown) may interrupt further movement and cause operation of the fluid cylinders 38 to momentarily shift respective knives 37 toward knives 36 to thus notch respective strip edges at the strip weld. The opening of contacts TDD-3 in circuit 162 will interrupt current flow in circuit 62 to thus cause the cylinder 43 to once again open jaws 42 of the carriage 41 and the closing of contacts TDD-1 in circuit 55 will energize solenoid coil TDE and initiate a time delay period at the termination of which contacts TDE-1 will close and contacts TDE-2 and 3 will open.

The opening of contacts TDE-3 in circuit 65 will cause the return of the clipper mechanism to the position seen in FIGURE 3 while the opening of contacts TDE-2 in circuit 163 will interrupt current flow in circuit 63 to thus cause the return of carriage 41 to the position seen in FIGURE 1. The closing of contacts TDE-1 in circuit 56 will energize solenoid coil TDF and initiate a time delay period at the termination of which contacts TDF-1, 2 and 3 will close.

The closing of contacts TDF-3 will cause fluid cylinder 48 to shift stop 45 from the position seen in FIGURE 1 to a position wherein it will be interposed in the path of movement of bracket 47 of the carriage 41. The closing of contacts TDF-2 in circuit 262 will cause current flow in circuit 62 to thus once again close the clamping jaws 42 on the strip. The closing of contacts TDF-1 in circuit 57 will energize solenoid coil TDG and initiate a time delay period at the termination of which contacts TDG-1 and 2 will close and contacts TDG-3 will open.

The opening of contacts TDG-3 in circuit 164 will interrupt current flow in circuit 64 to thus cause the fluid cylinders 24 to move the clamping jaws 21, 20 of the joint trimming section B away from each other to release the strip. The closing of contacts TDG-2 in circuit 263 will re-establish current flow in circuit 63 to thus actuate cylinder 44 to effect movement of the carriage 41 from right to left. Such movement of the carriage will shift the strip from right to left until carriage movement is interrupted by stop 45 which, it will be recalled, is in its elevated, carriage-bracket engaging position. It is to be understood that the aforesaid movement of the carriage 41 will shift the strip to align its welded joint precisely with portion B-1 of the joint trimming section B. The closing of contacts TDG-1 in circuit 58 will energize solenoid coil TDH and initiate a time delay period at the termination of which contacts TDH-1 and 2 will close.

The closing of contacts TDH-2 in circuit 264 will cause current flow in circuit 64 to thus once again cause fluid cylinders 24 to move the strip clamping jaws 21, 20 together to immobilize the strip. The closing of contacts TDH-1 in circuit 59 will energize solenoid coil TDI and initiate a time delay period at the termination of which contacts TDI-1 and 2 will close and contacts TDI-3 will open.

The closing of contacts TDI-2 in circuit 67 will cause current flow in the latter and thus cause the fluid cylinder 29 to move the slides 25, 26 from left to right (FIGURE 2) so that the cutters 27, 28 will traverse the strip to trim the welded strip joint. The opening of contacts TDI–3 in circuit 262 will interrupt current flow in circuit 62 whereupon the fluid cylinder 43 will permit the strip clamping jaws 42 to open and release the strip. The closing of contacts TDI–1 in circuit 60 will energize solenoid coil TDJ and initiate a time delay at the termination of which contacts TDJ–1 will open.

The opening of contacts TDJ–1 in the holding circuit 50 will interrupt current flow in circuit 49 and thus solenoid coil SRA will be de-energized. This will in turn de-energize all of the solenoid coils TDA through TDJ and thus the circuit parts will be returned to the positions seen in FIGURE 4. The interruption of current flow in circuit 67 will cause the slides 25, 26 to return to the position seen in FIGURE 2; interruption of current flow in circuit 66 will cause retraction once again of the stop 45; interruption of current flow in circuit 64 will cause clamping jaws 21, 20 to open again; and interruption of current flow in circuit 63 will again return the carriage 41 to the position seen in FIGURE 1. At this time, therefore, the joint trimming apparatus will have completely released the strip whereupon it may once again be freely drawn into the strip-consuming line until another welding operation is to be made.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. Apparatus for joining strip material in end-to-end relation, which strip material is movable longitudinally in a predetermined direction, comprising welding means for securing respective strip ends together by forming a transversely extending welded joint therebetween, strip gripping means spaced from said welding means in the direction of strip movement and movable longitudinally of the strip, first joint trimming means intermediate said welding means and said strip gripping means, second joint trimming means intermediate said welding means and said first trimming means, one of said joint trimming means removing weld surplus projecting flatwise of the strip and the other removing weld surplus projecting edgewise of the strip, strip clamping means adjacent one of said trimming means for holding the strip immobilized, means for engaging said strip gripping means with said strip and for effecting movement of said strip gripping means and consequently the strip gripped thereby in the direction of strip movement and in an amount equal to the spacing between said second trimming means and said welding means, following operation of the latter, to align the welded strip joint with said second trimming means, means for actuating said clamping means to grip the strip following disposition of the welded strip joint at said second trimming means, means for disengaging said strip gripping means from the strip and for effecting movement thereof in the direction opposite to that of strip movement following gripping of the strip by said clamping means, means for re-engaging said strip gripping means with the strip following operation of said second trimming means and for effecting movement of said strip gripping means and consequently the strip gripped thereby in the direction of strip movement and in an amount equal to the spacing between respective trimming means, following release of the strip by said clamping means, to align the welded strip joint with said first trimming means.

2. Apparatus for joining metal strip in end-to-end relation, comprising welding means for securing respective strip ends together by forming a transversely extending welded joint therebetween, joint trimming means fixedly spaced from said welding means in a direction longitudinally of strip movement for removing weld surplus from the strip, strip gripping means mounted for movement in a direction longitudinally of strip movement, means for closing said strip gripping means on the strip to grip the latter prior to completion of the welding operation, and means operating after the welding operation for shifting said strip gripping means and the strip gripped thereby a precise amount equal to the distance between said welding means and said joint trimming means to accurately align the welded joint with said trimming means.

3. Apparatus for joining metal strip in end-to-end relation, comprising welding means for securing respective strip ends together by forming a transversely extending welded joint therebetween, first joint trimming means spaced from said welding means in a direction longitudinally of strip movement for removing certain weld surplus, second joint trimming means spaced a different distance from said welding means in a direction longitudinally of strip movement for removing certain other weld surplus projecting from the strip, strip gripping means mounted for movement in a direction longitudinally of strip movement, means for closing said strip gripping means on the strip to grip the latter prior to the completion of the welding operation, and means for shifting said strip gripping means and the strip gripped thereby first a precise amount equal to the distance between said welder and said first joint trimming means to accurately align the welded joint with the latter, and second, following operation of said first joint trimming means, a precise amount equal to the distance between said first and second joint trimming means to accurately align the welded joint with the latter.

4. The construction according to claim 3 wherein said strip gripping means includes a movable carriage, and fixed abutments are located in the path of carriage movement and abut with the carriage to precisely determine the positions of said strip gripping means.

5. The construction according to claim 3 wherein one of said joint trimming means removes weld surplus from opposite edges of the strip and the other of said joint trimming means removes weld surplus from opposite sides of the strip.

6. The construction according to claim 5 wherein said one joint trimming means notches opposite edges of the strip at the weld line.

7. Apparatus for joining metal in end-to-end relation, comprising welding means for securing respective strip ends together by forming a transversely extending welded joint therebetween, said welding means having clamping jaws to hold the strip stationary during welding operations, first joint trimming means spaced from said welding means in a direction longitudinally of strip movement for removing certain weld surplus, said first joint trimming means having strip gripping clamps to hold the strip during its operation, second joint trimming means spaced a greater distance from said welding means in a direction longitudinally of strip movement for removing certain other weld surplus from the strip, a carriage spaced a still greater distance from the welding means in a direction longitudinally of strip movement and reciprocable in said longitudinal direction, said carriage having strip gripping clamps to longitudinally move the strip with the carriage, a pair of spaced abutments in line with carriage travel and abuttable with the carriage to precisely locate the latter in two positions, one of said abutments being located closer to said welding means than the other and being retractable to clear said carriage without abutment, means for clamping said clamping jaws on the trailing and leading edges of strip to be joined to hold the same during welding operation, means for clamping said strip gripping clamps of said carriage prior to release of said clamping jaws following the welding operation, means to move said carriage and the strip clamped thereto from a start position to said first joint trimming means, said retractable abutment being retracted to pass said carriage and the latter abutting said other abutment to precisely locate the welded joint with respect to said first joint trimming means, means for clamping the strip gripping clamps of said first joint trimming means on said strip to hold the latter during trimming operation, means for releasing the strip gripping clamps of said carriage prior to release of the strip gripping clamps of said first joint trimming means, means for returning said carriage to said start position, means for again clamping the strip gripping clamps of said carriage on the strip, means for subsequently releasing the strip gripping clamps of said first joint trimming means from said strip, means for extending said retractable abutment, and means for moving said carriage and the strip clamped thereto from said start position to abutment with the extended abutment to precisely locate the welded joint with respect to said second joint trimming means.

References Cited in the file of this patent

UNITED STATES PATENTS 2,314,656     Morton _____ Mar. 23, 1943

Notice of Adverse Decision in Interference

In Interference No. 92,698 involving Patent No. 3,003,052, A. L. Williams and F. A. Bodenheim, STRIP JOINING APPARATUS, final judgment adverse to the patentees was rendered Mar. 22, 1965, as to claims 2, 3, 4, 5 and 6.
[*Official Gazette September 28, 1965.*]